United States Patent [19]
Kokuzawa et al.

[11] Patent Number: 5,696,187
[45] Date of Patent: Dec. 9, 1997

[54] METHYL METHACRYLATE-STYRENE COPOLYMER RESIN COMPOSITION SHEET

[75] Inventors: Yukio Kokuzawa; Yoshio Imae; Kazunobu Sato, all of Hiratsuka, Japan

[73] Assignee: Mitsubishi Gas Chemical Company, Inc., Tokyo, Japan

[21] Appl. No.: 521,969

[22] Filed: Aug. 31, 1995

Related U.S. Application Data

[63] Continuation-in-part of Ser. No. 366,811, Dec. 30, 1994, abandoned.

Foreign Application Priority Data

Jan. 21, 1994 [JP] Japan .................................. 6-005250

[51] Int. Cl.$^6$ .................................................. C08K 5/42
[52] U.S. Cl. ........................ 524/161; 524/494; 359/443; 359/452
[58] Field of Search ................................ 524/161, 494; 359/443, 452

[56] References Cited

U.S. PATENT DOCUMENTS

| | | | |
|---|---|---|---|
| 4,551,494 | 11/1985 | Lohmeijer | 524/89 |
| 5,306,746 | 4/1994 | Ida et al. | 523/206 |

FOREIGN PATENT DOCUMENTS

| | | | |
|---|---|---|---|
| 1-197552 | 8/1989 | Japan | 524/161 |
| 2-233743 | 9/1990 | Japan | 524/161 |
| 4-114051 | 4/1992 | Japan | 524/161 |

*Primary Examiner*—Peter D. Mulcahy
*Attorney, Agent, or Firm*—Frishauf, Holtz, Goodman, Langer & Chick, P.C.

[57] ABSTRACT

A methyl methacrylate-styrene copolymer resin composition in the form of an optical sheet which comprises: (A) 100 parts by weight of a methyl methacrylate-styrene copolymer resin having a weight ratio of methyl methacrylate units to styrene units of 75:25 to 50:50, (B) 0.5 to 5 parts by weight of a lithium sulfonate having a $C_8$–$C_{16}$ alkyl group, and (C) 0.3 to 1.5 parts by weight of glass beads, as a light diffuser. The methyl methacrylate-styrene copolymer resin composition in the form of an optical sheet of the present invention has excellent antistatic properties and appearance properties. By using the lithium sulfonate in the form of a solution, excellent light diffusion properties (without impaired dispersion properties), excellent total light transmittance and desired coloring properties can be obtained, and hence desirable optical properties and desirable physical properties and dimensional stability can be obtained.

15 Claims, No Drawings

METHYL METHACRYLATE-STYRENE COPOLYMER RESIN COMPOSITION SHEET

CROSS-REFERENCE TO RELATED APPLICATION

This is a continuation-in-part of application Ser. No. 08/366,811 filed on Dec. 30, 1994, now abandoned.

BACKGROUND OF THE INVENTION

1. Field of the Invention

The present invention relates to a methyl methacrylate-styrene copolymer resin composition sheet which is excellent in antistatic properties, appearance properties, optical properties, physical properties and dimensional stability. More specifically, it relates to a methyl methacrylate-styrene copolymer resin composition sheet suitable for optical sheets which can be used, for example, as light diffusing sheets, Fresnel lenses, and lenticular lenses for screens of projection televisions, and also suitable for material sheets of electronic and electric equipment which should be protected from dust and the like.

2. Description of the Related Arts

Optical sheets which can be used in projection televisions and the like are required to have sufficient stiffness and dimensional stability to inhibit deflection when they are used in televisions, even if the wall thickness of the sheets are reduced, in order to permit the aggrandizement of screens and to heighten the sharpness of images.

Furthermore, materials for optical sheets which can be used in televisions and the like are usually required to have good light diffusion properties so as to enlarge a viewing angle and to thereby obtain clear images to be easily viewed and particularly in order to meet this requirement, sheets having high refractive indexes are preferably used.

As the conventional sheets for these uses, acrylic resin (hereinafter sometimes referred to as PMMA) sheets and polycarbonate resin (hereinafter sometimes referred to as PC) sheets have been used.

However, in the case of the PMMA sheets, the stiffness is high, but hygroscopicity is also high, so that the dimensional stability is poor and the refractive index is also as low as 1.49. For these reasons, the PMMA sheets are not practical for the optical sheets. On the other hand, in the case of the PC sheets, the hygroscopicity is conversely low, so that the dimensional stability is good and the refractive index is also as high as 1.59. However, the stiffness is low, and for this reason, the PC sheets are not suitable for the optical sheets.

In view of the foregoing, the present inventors have conducted investigations on the optical sheets and the like, and as a result, it has been found that a methyl methacrylate-styrene copolymer resin (hereinafter sometimes referred to as MS) sheet having the high stiffness and the low hygroscopicity and hence having the excellent dimensional stability and the proper refractive index of 1.52 to 1.54 is preferable as the optical sheets and the like.

However, the optical sheets and the like are also required to possess antistatic properties so as to prevent the deterioration of transparency caused by the adhesion of dust on the surface of the sheets, in addition to the above-mentioned physical properties.

Thus, various methods have been disclosed to impart the antistatic properties to a thermoplastic resin. For example, in Japanese Patent Publication No. 37414/1989, a method is disclosed in which an alkaline metal salt of a sulfonic acid is kneaded with the thermoplastic resin. In this case, the antistatic properties of the sheets are good, but since the compatibility of the MS with the sulfonate is very poor, appearance failures such as sink marks and cloudy lines occur on the sheets, and in addition, there is a problem that transparency cannot be obtained, and there are other problems.

Furthermore, Japanese Patent Application Laid-open No. 43440/1991 discloses that the PMMA is blended with a metal sulfonate such as an aromatic sulfonic acid and a polyether, and the resultant blend is then molded to prepare sheets, and Japanese Patent Application Laid-open No. 197552/1989 discloses that the PMMA is blended with a metal sulfonate and a glycerin fatty acid ester, and the resultant blend is then molded to obtain sheets. In these cases, the appearance of the sheets can be improved. However, transparency of the sheets is occasionally damaged in the case of MS, and also it is not easy to blend the metal sulfonate with the thermoplastic resin because of the very high hygroscopicity of the metal sulfonate.

For that reason, the following difficulties arises the dispersion of a light diffuser is impaired when the light diffuser is used together with the metal sulfonate, a process for preparing an optical sheet becomes complicated when other compounds are further blended, and also the sheets have less heat-resistancy, are colored, and have diminished physical properties such as strength or hardness.

SUMMARY OF THE INVENTION

The present inventors have researched with the intension of overcoming the drawbacks of conventional methods, and as a result, it has been found that when a methyl methacrylate-styrene copolymer resin is blended with a specific amount of a specific lithium alkylbenzene-sulfonate represented by the undermentioned general formula (1) and specific inorganic fine particles as a light diffuser, optical sheets can be obtained which are excellent in antistatic properties and appearance properties.

In addition, the present inventors have also found that when a methyl methacrylate-styrene copolymer resin is blended with the lithium alkylbenzene-sulfonate which is a liquid prepared by mixing a specific solvent, optical sheets can be obtained which have excellent light diffusion properties, without impairing the dispersion of the light diffuser, an excellent total light transmittance and coloring properties, and hence excellent optical properties and excellent physical properties and dimensional stability.

Concretely, the following facts have been found. An interaction between styrene contained in an MS and an aromatic ring contained in the structure of the lithium alkylbenzene-sulfonate exerts a proper compatibility, and so the appearance failure is improved and good antistatic properties are obtained.

It has also been found that when a specific amount of specific inorganic fine particles is blended as the light diffuser, optical properties suitable for optical use can be obtained without impairing the transparency.

The present invention has been completed on the basis of the above.

The present invention is directed to a methyl methacrylate-styrene copolymer resin composition sheet which comprises (A) 100 parts by weight of a methyl methacrylate-styrene copolymer resin having a weight ratio between a methyl methacrylate unit and a styrene unit as monomer units of 75:25 to 50:50 (the methyl methacrylate unit:the styrene unit), a weight-average molecular weight of 100000 to 200000, a refractive index of 1.52 to 1.54, a flexural modulus of 36000 to 40000 kg/cm² and a hygroscopicity of 0.15 to 0.25%, (B) 0.5 to 5 parts by weight of a lithium sulfonate represented by the general formula (1)

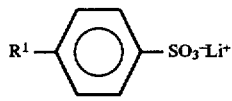

wherein $R^1$ is an alkyl group having 8 to 16 carbon atoms, and (c) 0.3 to 1.5 parts by weight of glass beads, as a light diffuser, containing at least 80% by weight of the glass beads which are in the range of 3 to 15 μm in particle diameter, a total light transmittance of the methyl methacrylate-styrene copolymer resin composition sheet being 85% or more and a half value angle of the methyl methacrylate-styrene copolymer resin composition sheet being in the range of 1.4 to 1.8 degrees.

DESCRIPTION OF PREFERRED EMBODIMENTS

In a methyl methacrylate-styrene copolymer resin composition sheet of the present invention, a methyl methacrylate-styrene copolymer resin which is a component (A) comprises 75 to 50% by weight of a methyl methacrylate unit and 25 to 50% by weight of a styrene unit, preferably 70 to 55% by weight of a methyl methacrylate unit and 30 to 45% by weight of a styrene unit as monomer units. This methyl methacrylate-styrene copolymer resin can be prepared by mixing methyl methacrylate with styrene in a ratio corresponding to the above-mentioned ratio of the monomer units, and then subjecting them to copolymerization.

In obtaining the copolymer resin, if the monomer blend ratio of methyl methacrylate is less than 50% by weight, mechanical properires such as strength and flexural strength deteriorate. On the other hand, if the monomer blend ratio of methyl methacrylate is more than 75% by weight, the refractive index of the obtained resin deteriorates, and the formation of pellets therefrom is difficult in a certain case.

The weight-average molecular weight of the methyl methacrylate-styrene copolymer resin which is the component (A) is in the range of 100000 to 200000, preferably 120000 to 180000 from the viewpoints of extrusion kneading properties and physical properties. Also from the viewpoint of obtaining a suitable melting viscosity under molding temperature conditions in molding the sheets by extruding this methyl methacrylate-styrene copolymer resin, the weight-average molecular weight of the methyl methcarylate-styrene copolymer resin is preferably in the range of 100000 to 200000.

Furthermore, the methyl methacrylate-styrene copolymer resin which is the component (A) has a refractive index of 1.52 to 1.54, a flexural modulus of 36000 to 40000 kg/cm² and a hygroscopicity of 0.15 to 0.25%. A monomer blend ratio of methyl methacrylate to styrene is selected so that the refractive index, the flexural modulus and the hygroscopicity of the methyl methacrylate-styrene copolymer resin which is the component (A) may be in the above-mentioned ranges, and this is preferable to use the composition sheets of the present invention using the component (A) in various optical instruments.

The refractive index, the flexural modulus and the hygroscopicity which are regulated in the present invention can be measured, for example, by the following procedures. The refractive index can be measured by bringing a contact liquid into contact with the resin which is a substance to be tested, and then allowing light having a specific wave-length to penetrate thereinto. The flexural modulus can be measured by the use of Tensilon or the like, after a just molded resin plate is allowed to stand at a certain temperature and humidity for a certain period of time. The hygroscopicity can be measured by immersing a just molded resin plate in water at a certain temperature for a certain time, and then calculating a weight difference between the plates before and after the immersion.

A lithium alkylbenzene-sulfonate which is a component (B) in the composition of the present invention can be represented by the formula (1)

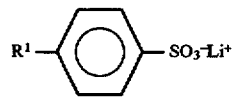

wherein $R^1$ is an alkyl group having 8 to 16 carbon atoms.

Typical examples of the lithium alkylbenzene-sulfonate (B) in the present invention include lithium dodecylbenzene-sulfonate and lithium octylbenzene-sulfonate.

These lithium sulfonates can be blended in a solid state, but since these sulfonate themselves are hard and have a strong hygroscopicity, prior to being blended with the component (A) and the like, the lithium sulfonate is preferably mixed with a solvent to form a liquid composition. This liquid composition comprises 60:40 to 90:10% by weight of the blend ratio of the lithium alkylbenzene-sulfonate and the solvent, preferably 70:30 to 85:15% by weight of the same ratio. If the content of the lithium alkylbenzene-sulfonate is in the above-mentioned range, removal of the solvent with an extruder can be easily executed and also stability in an extrusion of the present composition can be preferably maintained.

As the solvent used in the present invention, a mixture of a lower alkyl alcohol having 1 to 4 carbon atoms and water is preferably used. The blend ratio of both is in the range of 60:40 to 90:10 parts by weight, and preferably in the range of 70:30 to 80:20 parts by weight. In this range of the solvent, lithium sulfonate can be well dissolved and a liquid composition with preferable viscosity can be prepared, and hence, good dispersion of the components and good stability in the extrusion can be achieved.

In the composition sheet of the present ivnetnion, the blend ratio of the lithium alkylbenzene-sulfonate (B) is in the range of 0.5 to 5 parts by weight based on 100 parts by weight of the methyl methacrylate-styrene copolymer resin which is the component (A).

If the blend ratio of the lithium alkylbenzene-sulfonate is less than 0.5 part by weight, a sufficient antistatic effect cannot be obtained. If it is more than 5 parts by weight, it is difficult to mix the lithium alkylbezene-sulfonate with the methyl methacrylate-styrene copolymer resin, and in consequence, slip characteristics are poor at the raw material feed portion of an extruder, so that extrusion stability undesirably deteriorates. In addition, the appearance properties and transparency of the obtained sheet undesirably deteriorate.

As the light diffuser which is the composition (C) of the present invention, glass beads are preferably used, and good light diffusion properties can not be attained by the use of the particles of inorganic compounds other than the glass beads. The glass beads containing at least 80% by weight preferably at least 90% by weight of beads which are in the range of 3 to 15 μm in particle diameter are used. In the composition sheet of the present invention, the blend ratio of the glass beads is in the range of 0.5 to 1.2 parts by weight based on 100 parts by weight of the methyl methacrylate-styrene copolymer resin which is the component (A).

In addition, in the present invention a total light transmittance and a half value angle of the methyl methacrylate-styrene copolymer resin composition sheet are preferably 85% or more and 1.4 to 1.8 degree, respectively.

As mentioned above, in the present invention the glass beads having particle diameter of 3 to 15 μm are employed. When the particle diameter of the glass beads are 3 μm or more good light transparency can be attained, and also when the particle diameter is 15 μm or less good light diffusion properties can be attained. In particular, it is required that the optical sheets used in screens of projection televisions and the like should have the above stated total light transmittance and half value angle, and such optical properties can not be obtained in case where the glass beads having particle diameter of 3 to 15 μm are contained in less than 80% by weight. Accordingly, it is permitted that the glass beads having a particle diameter outside of the range of 3 to 15 μm, for example 1 to 3 μm or 15 to 25 μm, are contained in an amount of not exceeding 20% by weight.

As also noted above, the blend ratio of the glass beads is 0.3 to 1.5 parts by weight preferably 0.5 to 1.2 parts by weight based on 100 parts by weight of the methyl methacrylate-styrene copolymer resin. When the blend ratio is less than 0.3 part by weight, the light diffusion properties are not sufficient, and also when the blend ratio is more than 1.5 parts by weight air is involved into the sheets in the step of a sheet extrusion, thereby causing the appearance failure of the sheets.

Further in the present invention, glass beads having a surface treatment using of a wax can be used. In general, inorganic compounds are inclined to have an inferior dispersion and have a tendency to be agglomerated in a resin composition, and hence cause the sheets to be lowered in optical properties and to be deteriorated in the appearance. For that reason, by application of the surface-treatment of the glass beads using a wax, above all higher fatty acid amides, the inferior dispersion and the agglomeration can be suppressed, thus making it possible to prepare the sheets with good apperance and excellent optical properties. As the higher fatty acid amides, methylene bis stearoamide, ethylene bis stearoamide, stearic acid amide, palmitic acid and the like are cited, and these are used alone or in combination thereof.

As afore-mentioned, the total light transmittance of the methyl methacrylate-styrene copolymer resin composition sheet in the present invention is 85% or more. In case it is less than 85%, much light is lost, and then the sharpness of screen-images becomes insufficient. It is preferable to control the total light transmittance to the practical level of 86 to 91% by blending the glass beads in accordance with the present invention.

As also afore-mentioned, the half value angle of the methyl methacrylate-styrene copolymer resin composition sheet in the present invention is preferably in the range of 1.4 to 1.8 degrees. The half value angle in the present invention is defined as an angle to be formed between the light axis and a light receptor which turned around a sample necessary to lower the luminance to 50 level, in the case where the luminance on the light axis is assumed as 100 level viewing the parallel light admitted vertically in the surface of a sample from the opposite side of the light source. In the case of optical sheets used for projection televisions, the higher the half value angle and the total light transmittance are, the better the light diffusion properties become. Then, it is possible to widen the viewing angle of screens and to make the screen images light and easy to be viewed. The half value angle is preferably in the range of 1.4 to 1.8 degrees, in order to control the loss of light energy and obtain appropriate light diffusion properties.

In the case that the methyl methacrylate-styrene copolymer resin composition sheet of the present invention is used for optical sheets for the screens of projection televisions, its thickness is in the range of 0.8 to 10 mm, preferably 1.0 to 5.0 mm.

When the thickness of the sheet is in the above-mentioned range, the stiffness of the sheet can be maintained and manufacturing is also preferably easy. When a sheet having a small thickness is used, the screen is in a lighted state, but if the thickness of the sheet is less 0.8 mm, the lens is so soft that its physical properties deteriorate on occasion. On the other hand, if it is more than 10 mm, the manufacture of the lens is difficult on occasion.

The methyl methacrylate-styren copolymer resin composition sheet of the present invention can be blended, as desired, with various additives such as a stabilizer, a pigment, a dye, a flame retardant and a lubricant, an elastomer and a filler. The composition sheet of the present invention can be prepared by a conventional known process, and for example, there can be utilized a process in which a mixture obtained by dry blending or by the use of a supermixer is kneaded by an extruder.

For the manufacture of the methyl methacrylate-styrene copolymer resin composition sheet of the present invention, a usual sheet molding means such as extrusion can be applied.

The methyl methacrylate-styrene copolymer resin composition sheet of the present invention described above has excellent antistatic properties and appearance properties, excellent light diffusion properties without impairing the dispersion and total light transmittance, less coloring properties and hence excellent optical properties, and excellent physical properties and dimensional stability. With regard to the evaluation of these characteristics, for example, the appearance properties can be evaluated by visually comparing a sample with a blank sheet as a standard; a yellow index can be evaluated by comparing YI values in accordance with a transparence method by the use of a color-difference meter; a surface intrinsic resistivity can be evaluated by measuring a resistance value of a molded plate by the use of a micro-ammeter after the molded plate is allowed to stand under certain conditions; and the total light transmittance and a haze can be evaluated by the use of a haze meter.

Next, the present invention will be described in more detail with reference to the following non-limitative examples.

Evaluation was made in accordance with the following procedures.

(1) A refractive index was measured, using α-bromonaphthalene as a contact liquid in accordance with JIS-K7105 by the use of a R Abbe's refractometer 4T model made by Atago Co., Ltd.

(2) A flexural strength and a flexural modulus were measured for a molded plate in accordance with JIS-K7203 by the use of Tensilon UTM-5T model made by Toyo Bold Win Co., Ltd. after the just molded plate was allowed to stand in a thermostatic chamber at 23° C. and 50% humidity for 88 hours.

(3) Hygroscopicity was measured by immersing a just molded resin plate in water at 23° C. for 24 hours, and then expressing, in a percent, a weight difference between the plates before and after the immersion in acordance with JIS-K7209.

(4) An extrusion was evaluated by visual comparison on the situation in case where the fusion, blending, and extrusion were conducted using a vent-type 45 mm diameter twin-screw extruder. The symbol O denotes the case where the extrusion was carried out smoothly without any problems, and the symbol X denotes the case where the extrusion was difficult because of agglomeration and the resin not falling down in a hopper.

(5) Appearance properties were evaluated by visual comparison on the basis of blank sheet (comprising a synthetic polymer alone). The symbol O denotes a sample having transparency, no fogging, no sink mark and no cloudy lines, and the symbol X denotes a sample having the fogging, sink mark and cloudy lines.

(6) A yellow index (YI value) was measured in accordance with a transparence method (JIS-K7105) by the use of a color difference meter (model: $Z^{-\Sigma}$ 80) made by Nippon Denshoku Kogyo Co., Ltd.

(7) A surface specific resistance was measured for a molded plate in accordance with JIS-K6911 by the use of a R-12704 digital extra-high resistance/micro-ammeter made by Advantest Corporation, after the just molded plate was allowed to stand at 23° C. and 50% humidity for 24 hours in a thermostatic chamber.

(8) A total light transmittance and a haze (JIS-K7105) were measured by the use of a haze meter (model: NDH) made by Nippon Denshoku Industry Co., Ltd.

(9) A half value angle was measured by the use of a photometer with an automatically variable angle (model:GONIOPHOTOMETER) made by Murakami Shikisai Gijutsu Research Co., Ltd.

Furthermore, the total light transmittance of a MS was 92%, and values of the total light transparence, the refractive index, the flexural modulus and the hygroscopicity of a PC and a PMMA are shown in Table 1.

EXAMPLES 1 TO 3

A methyl methacrylate-styrene copolymer resin (pellets having a weight-average molecular weight of 150000 obtained by copolymerizing a monomer mixture comprising 64% by weight of methyl methacrylate and 36% by weight of styrene) was blended with lithium dodecylbenzene-sulfonate which was a liquid composition comprising a lithium sulfonate/IPA/water (80/15/5% by weight) and glass beads which contained 80% or more by weight of particle diameter being in the range of 3 to 15 m and comprised an average particle diameter of 5 to 7 µm (model:EMB-10) made by Toshiba Ballotini Co., Ltd, in each ratio shown in Table 2, and they were stirred and mixed by a supermixer, and then molten, kneaded and extruded at a resin temperature of 230° C. by using a vent-type 45 mm diameter twin-screw extruder to form pellets. Next, test pieces were made at a resin temperature of 235° C. by using a vent-type 65 mm diameter sheet extruder, and various physical properties were then measured.

The measured results are shown in Table 2.

EXAMPLE 4

Test pieces were made by the same procedure as in Example 1 except that the methyl methacrylate-styrene copolymer resin used in Example 1 was blended with lithium dodecylbenzene-sulfonate and glass beads which contained 80% or more by weight of particle diameter being in the range of 3 to 15 µm and comprised an average diameter of 10 to 12 µm (model:EMB-20 made by Toshiba Ballotini Co., Ltd.) in each ratio shown in Table 3, and various physical properties were then measured.

The measured results are shown in Table 3.

EXAMPLE 5

Test pieces were made by the same procedure as in Example 1 except that the methyl methacrylate-styrene copolymer resin used in Example 1 was blended with lithium dodecylbenzene-sulfonate and glass beads (model:EMB-10) on the surfaces of which were treated with a wax (the ratio of the glass beads and ethylene bis stearoamide was 100:10 parts by weight) in each ratio shown in Table 3, and various physical properties were then measured.

The measured results are shown in Table 3.

COMPARATIVE EXAMPLES 1 AND 2

Test pieces were made by the same procedure as in Example 1 except that the methyl methacrylate-styrene copolymer resin used in Example 1 was blended with lithium dodecylbenzene-sulfonate and as a light diffuser barium sulfate having an average particle diameter of 5 µm and made by Nippon Kagaku Kogyo Co., Ltd. in a ratio shown in Table 4, and various physical properties were then measured.

The measured results are shown in Table 4.

COMPARATIVE EXAMPLE 3

Test pieces were made by the same procedure as in Example 1 except that the methyl methacrylate-styrene copolymer resin used in Example 1 was blended with lithium dodecylbenzene-sulfonate and as a light diffuser calcium carbonate having an average particle diameter of 2.2 m (model:SS-80 made by Nitto Funka Co., Ltd.) in a ratio shown in Table 4, and various physical properties were then measured.

The measured results are shown in Table 4.

TABLE 1

| Resin | MS | PC | PMMA | PS |
|---|---|---|---|---|
| Total Light Transmittance (%) | 92 | 89 | 93 | 90 |
| Refractive Index | 1.52–1.54 | 1.59 | 1.49 | 1.59 |
| Flexural Strength (kg/cm$^2$) | 1100–1200 | 900 | 1200 | 750 |
| Flexural Modulus (kg/cm$^2$) | 36000–40000 | 23000 | 35000 | 33000 |
| Hygroscopicity (%) | 0.15–0.25 | 0.2 | 0.3 | 0.03 |

TABLE 2

| Example | 1 | 2 | 8 |
|---|---|---|---|
| Blend Composition (pts. wt.) | | | |
| MS Copolymer Resin | 100 | 100 | 100 |
| DBSL | 1.0 | 1.0 | 3.0 |
| Glass Beads | 0.3 | 1.0 | 1.3 |
| Glass Beads (Treated with a wax) | — | — | — |
| Thickness (mm) | 1.8 | 1.8 | 1.8 |
| Extrusion situation | O | O | O |
| Appearance Properties | O | O | O |
| Yellow Index (YI value) | −0.5 | −3.2 | −4.8 |
| Surface Specific Resistance (Ω) | $4 \times 10^{12}$ | $3 \times 10^{12}$ | $1 \times 10^{11}$ |
| Total Light | 90 | 87 | 86 |

TABLE 2-continued

| Example | 1 | 2 | 8 |
|---|---|---|---|
| Transmittance (%) | | | |
| Half value Angle | 1.4° | 1.54° | 1.63° |

※Abbr.
DBSL: Lithium Dodecylbenzene-sulfonate

TABLE 3

| Example | 4 | 5 |
|---|---|---|
| Blend Composition (pts. wt.) | | |
| MS Copolymer Resin | 100 | 100 |
| DBSL | 1.0 | 3.0 |
| Glass Beads | 1.0 | — |
| Glass Beads (Treated with a wax) | — | 1.0 |
| Thickness (mm) | 1.8 | 1.8 |
| Extrusion situation | ○ | ○ |
| Appearance Properties | ○ | ○ |
| Yellow Index (YI value) | −3.5 | −3.1 |
| Surface Specific Resistance (Ω) | $4 \times 10^{12}$ | $3 \times 10^{11}$ |
| Total Light Transmittance (%) | 87 | 87 |
| Half value Angle | 1.6° | 1.63° |

※ Abbr.
DBSL: Lithium Dodecylbenzene-sulfonate

TABLE 4

| Comparative Example | 1 | 2 | 3 |
|---|---|---|---|
| Blend Composition (pts. wt.) | | | |
| MS Copolymer Resin | 100 | 100 | 100 |
| DBSL | 1.0 | 1.0 | 1.0 |
| Barium Sulfate | 0.3 | 1.0 | — |
| Calcium Carbonate | — | — | 1.0 |
| Thickness (mm) | 1.8 | 1.8 | 1.8 |
| Extrusion situation | ○ | ○ | ○ |
| Appearance Properties | ○ | ○ | ○ |
| Yellow Index (YI value) | −3.2 | 40 | — |
| Surface Specific Resistance (Ω) | $2 \times 10^{16}$ | $3 \times 10^{12}$ | $2 \times 10^{12}$ |
| Total Light Transmittance (%) | 91 | 85 | 75 |
| Half value Angle | 1.2° | 1.2° | 1.2° |

※Abbr.
DBSL: Lithium Dodecylbenzene-sulfonate

What is claimed is:

1. A methyl methacrylate-styrene copolymer resin composition in the form of an optical sheet which comprises: (A) 100 parts by weight of a methyl methacrylate-styrene copolymer resin having a weight ratio of a methyl methacrylate unit to a styrene unit as monomer units of 75:25 to 50:50, a weight-average molecular weight of 100000 to 200000, a refractive index of 1.52 to 1.54, a flexural modulus of 36000 to 40000 kg/cm² and a hygroscopicity of 0.15 to 0.25%, (B) 0.5 to 5 parts by weight of a lithium sulfonate of the formula (1)

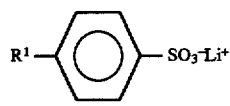

(1)

wherein $R^1$ is an alkyl group having 8 to 16 carbon atoms, and (C) 0.3 to 1.5 parts by weight of glass beads, as a light diffuser, wherein at least 80% by weight of the glass beads have a particle diameter of 3 to 15 μm, a total light transmittance of the methyl methacrylate-styrene copolymer resin composition in the form of an optical sheet being 85% or more and a half value angle of the methyl methacrylate-styrene copolymer resin composition in the form of an optical sheet being 1.4 to 1.8 degrees.

2. The methyl methacrylate-styrene copolymer resin composition in the form of an optical sheet according to claim 1, wherein the lithium sulfonate is in a liquid composition comprising a solvent, in a weight ratio of lithium sulfonate to solvent of 60:40 to 90:10.

3. The methyl methacrylate-styrene copolymer resin composition in the form of an optical sheet according to claim 1, wherein the glass beads are surface-treated with a wax.

4. The methyl methacrylate-styrene copolymer resin composition in the form of an optical sheet according to claim 2, wherein the solvent comprises an alcohol having 1 to 4 carbon atoms and water, in a ratio of alcohol:water of 60:40 to 90:10 parts by weight.

5. The methyl methacrylate-styrene copolymer resin composition in the form of an optical sheet according to claim 3, wherein the wax is a higher fatty acid amide.

6. The methyl methacrylate-styrene copolymer resin composition in the form of an optical sheet according to claim 1, wherein the weight ratio of the methyl methacrylate unit to the styrene unit is 70:30 to 55:45.

7. The methyl methacrylate-styrene copolymer resin composition in the form of an optical sheet according to claim 6, wherein the weight-average molecular weight is 120,000 to 180,000.

8. The methyl methacrylate-styrene copolymer resin composition in the form of an optical sheet according to claim 1, wherein the lithium sulfonate is selected from the group consisting of lithium dodecylbenzene-sulfonate and lithium octylbenzene-sulfonate.

9. The methyl methacrylate-styrene copolymer resin composition in the form of an optical sheet according to claim 1, wherein at least 90% of the weight of the glass beads have a particle diameter of 3 to 15 μm.

10. The methyl methacrylate-styrene copolymer resin composition in the form of an optical sheet according to claim 9, wherein the glass beads are contained in an amount of 0.5 to 1.2 parts by weight, based on 100 parts by weight of the methyl methacrylate-styrene copolymer resin.

11. The methyl methacrylate-styrene copolymer resin composition in the form of an optical sheet according to claim 5, wherein said fatty acid amide is at least one member selected from the group consisting of methylene bis stearoamide, ethylene bis stearoamide, stearic acid amide and palmitic acid.

12. The methyl methacrylate-styrene copolymer resin composition in the form of an optical sheet according to claim 1, wherein the total light transmittance is 86 to 91%.

13. The methyl methacrylate-styrene copolymer resin composition in the form of an optical sheet according to claim 2, wherein the solvent comprises an alcohol having 1 to 4 carbon atoms and water in a ratio of alcohol:water of 60:40 to 90:10 parts by weight; the weight ratio of the methyl methacrylate unit to the styrene unit is 70:30 to 55:45; the weight-average molecular weight is 120,000 to 180,000; and the lithium sulfonate is selected from the group consisting of lithium dodecylbenzene-sulfonate and lithium octylbenzene-sulfonate.

14. The methyl methacrylate-styrene copolymer resin composition in the form of an optical sheet according to claim 13, wherein at least 90% of the weight of the glass beads have a particle diameter of 3 to 15 μm; the glass beads are contained in an amount of 0.5 to 1.2 parts by weight, based on the 100 parts by weight of the methyl methacrylate-styrene copolymer resin; and the glass beads are surface treated with at least one fatty acid amide selected from the group consisting of methylene bis stearoamide, ethylene bis stearoamide, stearic acid amide and palmitic acid.

15. A methyl methacrylate-styrene copolymer resin composition in the form of an optical sheet which consists essentially of: (A) 100 parts by weight of a methyl methacrylate-styrene copolymer resin having a weight ratio of a methyl methacrylate unit to a styrene unit as monomer units of 75:25 to 50:50, a weight average molecular weight of 100000 to 200000, a refractive index of 1.52 to 1.54, a flexural modulus of 36000 to 40000 kg/cm² and a hygroscopicity of 0.15 to 0.25%, (B) 0.5 to 5 parts by weight of a lithium sulfonate of the formula (1)

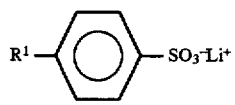

(1)

wherein $R^1$ is an alkyl group having 8 to 16 carbon atoms, and (C) 0.3 to 1.5 parts by weight of glass beads, as a light diffuser, wherein at least 80% by weight of the glass beads have a particle diameter of 3 to 15 μm, a total light transmittance of the methyl methacrylate-styrene copolymer resin composition in the form of an optical sheet being 85% or more and a half value angle of the methyl methacrylate-styrene copolymer resin composition in the form of an optical sheet being 1.4 to 1.8 degrees.

* * * * *